United States Patent
Gilon et al.

(10) Patent No.: US 8,327,840 B2
(45) Date of Patent: Dec. 11, 2012

(54) SOLAR POWER TOWER SYSTEM OPERATION AND CONTROL

(75) Inventors: Yoel Gilon, Jerusalem (IL); Israel Kroizer, Jerusalem (IL)

(73) Assignee: Brightsource Industries (Israel) Ltd., Jerusalem (IL)

(*) Notice: Subject to any disclaimer, the term of this patent is extended or adjusted under 35 U.S.C. 154(b) by 140 days.

(21) Appl. No.: 12/841,335

(22) Filed: Jul. 22, 2010

(65) Prior Publication Data
US 2010/0282242 A1 Nov. 11, 2010

Related U.S. Application Data

(62) Division of application No. 12/269,785, filed on Nov. 12, 2008, now Pat. No. 8,001,960.

(60) Provisional application No. 60/987,132, filed on Nov. 12, 2007.

(51) Int. Cl.
*F24J 2/38* (2006.01)

(52) U.S. Cl. ........ 126/600; 126/643; 126/602; 126/572; 126/601; 136/248; 136/246; 60/641.5; 353/3

(58) Field of Classification Search ............ 126/600, 126/602, 572, 601, 643; 353/3; 136/248, 136/246; 60/641.5
See application file for complete search history.

(56) References Cited

U.S. PATENT DOCUMENTS

| | | |
|---|---|---|
| 811,274 A | 1/1906 | Carter |
| 2,999,943 A | 9/1961 | Willard |
| 3,892,433 A | 7/1975 | Blake |
| 3,924,604 A | 12/1975 | Anderson |
| 4,034,735 A | 7/1977 | Waldrip |
| 4,044,753 A | 8/1977 | Fletcher et al. |
| 4,102,326 A | 7/1978 | Sommer |
| 4,117,682 A | 10/1978 | Smith |
| 4,146,785 A | 3/1979 | Neale |
| 4,172,443 A | 10/1979 | Sommer |
| 4,219,729 A | 8/1980 | Smith |
| 4,227,513 A | 10/1980 | Blake et al. |

(Continued)

FOREIGN PATENT DOCUMENTS

DE 10248068 A1 5/2004

(Continued)

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

(Continued)

*Primary Examiner* — Steven B McAllister
*Assistant Examiner* — Avinash Savani
(74) *Attorney, Agent, or Firm* — Miles & Stockbridge P.C.; Mark A. Catan

(57) ABSTRACT

A solar energy collection system includes a primary solar receiver and a secondary solar receiver. The secondary solar receiver generates steam using energy from solar radiation incident thereon. The primary solar receiver receives the generated steam from the secondary solar receiver and superheats the steam using energy from solar radiation incident thereon. A plurality of heliostat-mounted mirrors reflects incident solar radiation onto one of the primary and secondary solar receivers. A controller aims a portion of the heliostat-mounted mirrors at the primary solar receiver such that a predetermined thermal profile is provided on a surface of the primary solar receiver.

20 Claims, 3 Drawing Sheets

U.S. PATENT DOCUMENTS

| | | | |
|---|---|---|---|
| 4,245,618 A | 1/1981 | Wiener | |
| 4,247,182 A | 1/1981 | Smith | |
| 4,265,223 A | 5/1981 | Miserlis et al. | |
| 4,283,887 A | 8/1981 | Horton et al. | |
| 4,289,114 A | 9/1981 | Zadiraka | |
| 4,331,829 A | 5/1982 | Palazzetti et al. | |
| 4,343,182 A | 8/1982 | Pompei | |
| 4,365,618 A | 12/1982 | Jones | |
| 4,438,630 A | 3/1984 | Rowe | |
| 4,459,972 A | 7/1984 | Moore | |
| 4,474,169 A | 10/1984 | Steutermann | |
| 4,485,803 A | 12/1984 | Wiener | |
| 4,490,981 A | 1/1985 | Meckler | |
| 4,512,336 A | 4/1985 | Wiener | |
| 4,564,275 A | 1/1986 | Stone | |
| 4,633,854 A | 1/1987 | Mayrhofer | |
| 4,913,129 A | 4/1990 | Kelly et al. | |
| 5,128,799 A | 7/1992 | Byker | |
| 5,417,052 A | 5/1995 | Bharathan et al. | |
| 5,578,140 A | 11/1996 | Yogev et al. | |
| 5,759,251 A | 6/1998 | Nakamura et al. | |
| 5,861,947 A | 1/1999 | Neumann | |
| 5,862,799 A | 1/1999 | Yogev et al. | |
| 5,899,199 A | 5/1999 | Mills | |
| 5,905,590 A | 5/1999 | Van Der Sluis et al. | |
| 5,982,481 A | 11/1999 | Stone et al. | |
| 6,080,927 A | 6/2000 | Johnson | |
| 6,131,565 A | 10/2000 | Mills | |
| 6,310,725 B1 | 10/2001 | Duine et al. | |
| 6,597,709 B1 | 7/2003 | Diver, Jr. | |
| 6,653,551 B2 | 11/2003 | Chen | |
| 6,662,801 B2 | 12/2003 | Hayden et al. | |
| 6,818,818 B2 | 11/2004 | Bareis | |
| 6,899,097 B1 | 5/2005 | Mecham | |
| 6,926,440 B2 | 8/2005 | Litwin | |
| 6,957,536 B2 | 10/2005 | Litwin et al. | |
| 6,959,993 B2 | 11/2005 | Gross et al. | |
| 7,042,615 B2 | 5/2006 | Richardson | |
| 7,191,597 B2 | 3/2007 | Goldman | |
| 7,191,736 B2 | 3/2007 | Goldman | |
| 7,207,327 B2 | 4/2007 | Litwin et al. | |
| 7,296,410 B2 | 11/2007 | Litwin | |
| 7,331,178 B2 | 2/2008 | Goldman | |
| 7,340,899 B1 * | 3/2008 | Rubak et al. | 60/641.8 |
| 7,523,921 B2 | 4/2009 | Garrity | |
| 7,884,279 B2 | 2/2011 | Dold et al. | |
| 8,001,960 B2 | 8/2011 | Gilon et al. | |
| 8,033,110 B2 | 10/2011 | Gilon et al. | |
| 2004/0086021 A1 | 5/2004 | Litwin | |
| 2004/0231716 A1 | 11/2004 | Litwin | |
| 2005/0126170 A1 | 6/2005 | Litwin | |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2007/0272234 A1 | 11/2007 | Allen et al. | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0293132 A1 | 11/2008 | Goldman et al. | |
| 2008/0295883 A1 * | 12/2008 | Ducellier et al. | 136/246 |
| 2008/0314438 A1 | 12/2008 | Tran et al. | |
| 2009/0038608 A1 | 2/2009 | Caldwell | |
| 2009/0056701 A1 | 3/2009 | Mills et al. | |
| 2009/0107485 A1 | 4/2009 | Reznik et al. | |
| 2009/0151769 A1 | 6/2009 | Corbin et al. | |
| 2009/0178668 A1 | 7/2009 | Boggavarapu | |
| 2009/0229264 A1 | 9/2009 | Gilon et al. | |
| 2009/0250052 A1 | 10/2009 | Gilon et al. | |
| 2010/0006087 A1 | 1/2010 | Gilon et al. | |
| 2010/0263709 A1 | 10/2010 | Norman et al. | |
| 2011/0220091 A1 | 9/2011 | Kroyzer | |
| 2012/0024282 A1 | 2/2012 | Gilon et al. | |

FOREIGN PATENT DOCUMENTS

| | | |
|---|---|---|
| EP | 0106688 | 3/1985 |
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/140021 | 11/2011 |
| WO | WO 2012/014153 | 2/2012 |

OTHER PUBLICATIONS

"Central Receiver Systems" in: STINE, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Rabl, A., "Tower Reflector for Solar Power Plan," *Solar Energy*, 1976, 18: pp. 269-271.

Stone, K.W., and Jones, S.A., "Analysis of Solar Two Heliostat Tracking Error Sources," Sandia National Laboratories, Report No. SAND99-0239C, Jan. 28, 1999.

Vant-Hull, L.L., and Pitman, C.L., "Static and Dynamic Response of a Heliostat Field to Flux Density Limitations on a Central Receiver," *Solar Engineering*, 1990, pp. 31-38.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

Mills et al., "Multi-Tower Solar Array Project," *Proceedings of the Solar Harvest Conference, 40th Annual Anzses Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1): pp. 94-101.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

* cited by examiner

SOLAR POWER TOWER SYSTEM OPERATION AND CONTROL

CROSS-REFERENCE TO RELATED APPLICATIONS

This application is a divisional of U.S. patent application Ser. No. 12/269,785, filed Nov. 12, 2008, currently pending, which claims the benefit of U.S. Provisional Patent Application No. 60/987,132, filed on Nov. 12, 2007, both of which are hereby incorporated by reference herein in their entirety.

FIELD

This application relates generally to the conversion of solar radiation to electric power, and, more particularly, to maintaining a predetermined thermal profile of a solar power receiver in a solar energy-based power generation system.

SUMMARY

Systems, methods, and devices for providing a predetermined thermal profile, such as a uniform solar heat flux profile, to a primary solar receiver(s) (or receiver section(s)) in a solar energy-based power generation system are disclosed herein.

An example of a solar energy collection system includes a primary solar receiver and a secondary solar receiver. The secondary solar receiver can generate steam using energy from solar radiation incident thereon. The primary solar receiver can receive the generated steam from the secondary solar receiver and superheating the steam using energy from solar radiation incident thereon. A plurality of heliostat-mounted mirrors can be disposed so as to reflect incident solar radiation at one of the primary and secondary solar receivers. A controller can be configured to control the plurality of heliostat-mounted mirrors. The controller can be further configured to aim at least a portion of the plurality of heliostat-mounted mirrors at the primary solar receiver so as to provide a predetermined thermal profile on a surface of the primary solar receiver.

The predetermined thermal profile can include a uniform solar heat flux on the surface of the primary solar receiver, a predetermined temperature profile on the surface of the primary solar receiver, or a predetermined heat flux profile on the surface of the primary solar receiver.

Preferably, the primary solar receiver operates at a higher temperature than the secondary solar receiver.

The solar energy collection system can also include a turbine electric power plant configured to use the superheated steam from the primary solar receiver.

The primary solar receiver may be arranged on top of a first tower and the secondary solar receiver may be arranged on top of a second tower. Alternatively, the primary solar receiver and the secondary solar receiver may be arranged on the same tower. The primary solar receiver may be arranged lower on the same tower than the secondary solar receiver.

The controller may be configured to receive feedback regarding a state of a thermal profile on the surface of the primary solar receiver and to adjust the aiming of the plurality of heliostat-mounted mirrors at the primary solar receiver in response thereto.

An example of a method for controlling a central solar concentrating energy system may include determining an amount of energy directable by each of a plurality of heliostats onto each of a primary solar receiver and a secondary solar receiver located at different positions. The primary solar receiver and secondary solar receiver can each have heat exchangers configured to heat a working fluid to thereby power a generator. The method may further include, at a first time, selecting a first portion of the plurality of heliostats and aiming the selected first portion at the primary solar receiver responsively to a result of the determining. At a second time, the determining may be repeated. The method may further include, at the second time, selecting a second portion of the plurality of heliostats different from said first portion and aiming the selected second portion at the primary solar receiver. Each selecting may be based on a desired thermal profile for a surface of the primary solar receiver.

The desired thermal profile may include a predetermined temperature profile on the surface of the primary solar receiver, a predetermined heat flux profile on the surface of the primary solar receiver, or a uniform solar heat flux on the surface of the primary solar receiver.

Preferably, the primary solar receiver has a higher operating temperature than the secondary solar receiver.

The selecting at the second time may include determining a uniformity of temperature or energy flux on the surface of the primary solar receiver. The aiming at the second time may be responsive to the determining the uniformity.

The repeating the determining at the second time may be responsive to a feedback signal indicating a change in a thermal profile for the surface of the primary solar receiver.

In an example of a method for controlling heliostat-mounted mirrors in a solar energy collection system, the solar energy collection system may include a primary receiver, a secondary receiver, and a plurality of heliostat-mounted reflectors. The primary receiver may have more stringent operating criteria than the secondary receiver. Each heliostat-mounted reflector can be configured to direct incident solar radiation onto one of the primary and secondary receivers.

The method may include observing a state of the primary receiver, comparing the observed state to a predetermined state for the primary receiver, and directing at least a portion of the heliostat-mounted reflectors onto or away from the primary receiver based at least in part on said comparing. The predetermined state can be related to the operating criteria for the primary receiver.

The predetermined state can include a predetermined temperature profile of a surface of the primary receiver or a uniform heat flux profile on a surface of the primary receiver.

Preferably, the primary receiver operates at a higher temperature than the secondary receiver.

Objects, advantages and novel features of the present disclosure will become apparent from the following detailed description.

DETAILED DESCRIPTION

Figure 1A:
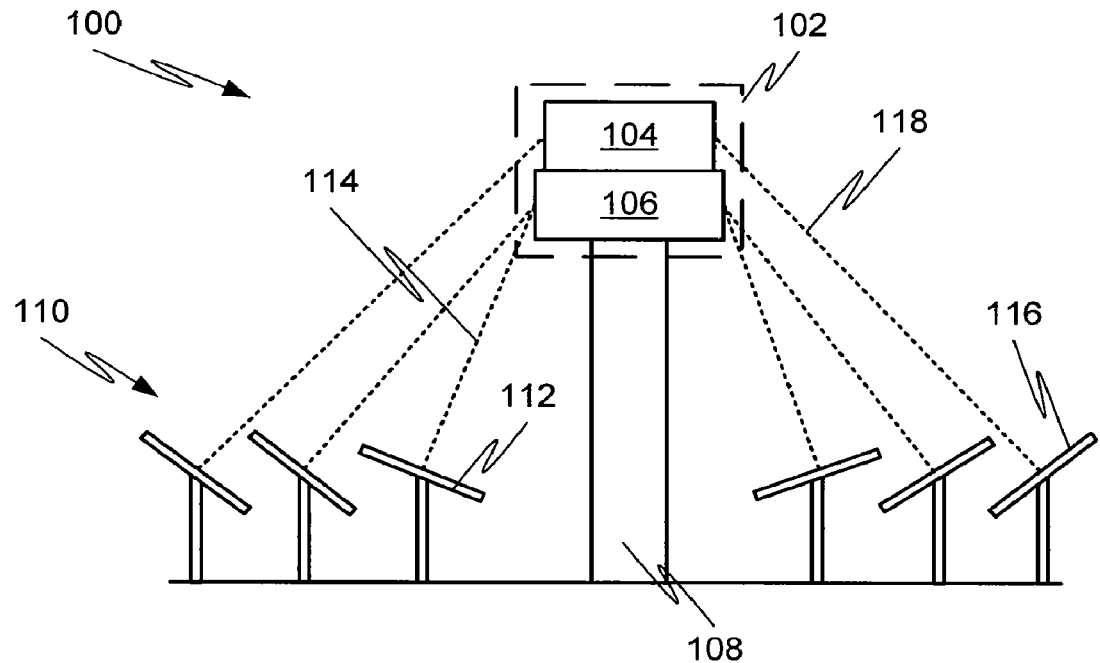
FIG. 1A is a diagrammatic elevation view of a solar power tower with two receivers in a field of heliostats.

In general, the present disclosure is directed to methods, systems, and devices for providing a uniform and/or accurate solar heat flux profile to a primary solar receiver(s) (or receiver section(s)) in a solar energy-based power generation system. A solar energy-based power generation system can convert solar energy to thermal energy and use the thermal energy to drive a generator. In the illustrative embodiments described herein, a working fluid, for example, steam, can be employed to power a prime mover, preferably a turbine operating on a Rankine cycle. The prime mover, which may be accompanied by additional prime movers in a single system, may be used for electric power generation, pumping, or any other suitable purpose. Preferably, the prime mover or movers is/are connected directly to a generator for electric power generation. One or more solar receivers are employed to receive concentrated sunlight from heliostats and convert the sunlight to heat. In some embodiments, the working fluid, such as water/steam, is circulated through the receiver. In other embodiments, a heat transfer fluid is circulated which transfers heat to the working fluid via an intermediate heat exchanger.

It is generally desirable to maintain a lower level of heat flux on the external surface of receivers (or receiver sections) in which a working fluid is heated to a higher temperature, compared with receivers in which a fluid is heated to a lower temperature. Among other reasons, this helps to avoid localized hotspots, where the margin for error in materials' design limits may be more easily breached than in lower temperature regions. For materials typically employed in solar boiler and/or receiver construction, the material strength decreases with increasing temperature. As receiver material temperatures increase, internal stresses generated by the working fluid (or other factors) on the receiver material could exceed the tensile strength thereof, potentially leading to catastrophic failure. Both the absolute temperature and the temperature gradient are concerns in this regard.

For example, a working fluid can be heated to a first temperature in the range of 350-500° C. in a secondary receiver (or receiver section). The working fluid from the secondary receiver may subsequently be further heated to a temperature in the range of 500-700° C. in a primary receiver (or receiver section). To achieve these working fluid temperatures, the secondary receiver (or receiver section) may have a desired solar heat flux on an external surface thereof in the range of 200-600 kW/m$^2$ while the primary receiver (or receiver section) may have a desired solar heat flux on an external surface thereof in the range of 100-200 kW/m$^2$. In another example, the working fluid in the primary receiver (or receiver section) is at a lower pressure than the fluid in the secondary receiver (or receiver section), for example, a reheating receiver. In such an example, the desired solar heat flux may be in the range of 80-130 kW/m$^2$. Note that the primary receiver (or receiver section) may be any portion that operates at a higher temperature or is otherwise more sensitive to temperature gradients (gradients taken over the flux receiving surface). For example, the primary receiver may serve to superheat the working fluid of a solar thermal plant. Another example is a reheater receiver. Both would operate at a lower heat flux (energy per unit area) than a secondary receiver (or receiver section), which may serve, for example, to preheat and/or evaporate the working fluid.

In the primary receiver (or receiver portion), there is a need to achieve greater uniformity of solar heat flux. The goal of temperature uniformity includes maximizing the working fluid temperature by maximizing the flux on the receiver without exceeding the local absolute temperature limits and temperature gradient limits of the receiver at any point. These requirements can translate to a single parameter defining a goal condition of a cost function which can be minimized through the control of the heliostats. In an embodiment, the cost function is employed in a function-minimization algorithm.

In an embodiment, each receiver portion (primary and secondary—or further) has a fixed number of target, or aiming, points on its surface. The function minimization algorithm assigns each heliostat to a respective target point based on the time of day, insolation levels, cloud cover, season of the year and any other variables that can be detected to characterize a current operating environment. For the present discussion, since it is the most sensitive to flux, we refer to the primary receiver portion, only. The primary receiver is given priority in terms of the heliostat allocation in order to define the heliostat-to-target point assignments that correspond to the minimum cost. In a first method, the cost function may be, for example, the sum of the difference between a peak allowed temperature for the receiver portion at a point on the receiver surface (which may vary over the surface of the receiver) and the measured or predicted temperature at that point, taken over the entire surface. A measured temperature may be used, but since conditions may vary quickly in a real system, a predicted temperature may be employed for the algorithm instead, the latter being derived from an accurate model of the system capable of providing a steady state or unsteady state temperature prediction based on current operating conditions (such schemes that rely on predictive conditions rather than measured are often referred to as "model-based control"). The negative effect of high gradients may be included in the function by including a variable multiplier for each temperature difference that increases with the magnitude of the temperature difference in the sum, for example by squaring the temperature difference.

$$\Sigma(T_{i,P}-T_{i,M})^2,$$

where $T_{i,P}$ is the predicted (or measured) temperature of the i positions of the receiver surface and $T_{i,M}$ is the maximum temperature of the i position of the receiver surface. Alternatively, a step-function F may provide a multiplier to the temperature difference and have a high where the predicted or measured temperature is more than a threshold magnitude below the maximum temperature.

$$\Sigma F(T_{i,P}-T_{i,M}) \cdot (T_{i,P}-T_{i,M})$$

The function F may also depend on the absolute temperature since the tolerance of the receiver to temperature gradients may be a function of the absolute temperature as well. To make the temperature prediction, the spot size and intensity pattern has to be predicted for the local surface corresponding to the aiming point for the particular heliostat. To do this, preferably, the performance characteristics of each heliostat are obtained, for example from measuring the light distribution on a reference surface using a reference light source, and this data translated into a set of characterizing data. For example, the precise shape of the surface can be stored as a triangle mesh or nonuniform rational B-spline (NURBS) model that can be used with ray-tracing to predict the beam image on the target based on current conditions. Preferably, current conditions are predicted using a season and time of day model and augmented based on insolation measurements to account for cloud cover and other atmospheric conditions.

Another type of cost function may account for the penalty of nonuniformity on the primary receiver by employing a step-function multiplier that defines limits on the non-uniformity but within those limits, calculates a negative revenue for the instant operating condition. By minimizing the negative instantaneous revenue, the cost function may not seek to achieve the highest possible temperature of the primary receiver, but may still satisfy, according to the boundary condition, a uniformity criterion.

To increase the speed and lower the calculation burden, various heuristics may be used to reduce the size of the assignment optimization space. For example, certain heliostats would never be assigned to certain aiming points due to strongly negative cosine losses, occultation losses, or because of the distance from the heliostat to the aiming point. So some assignments may simply be removed from the list of assignments to model. Other heuristics may be employed to speed the algorithm such as baseline assignment maps for a set of standard conditions (e.g., based on time, season, and average insolation level). These assignments would be assumed and then additional assignments made to bring the flux up to the optimum level using unassigned heliostats. Another way to reduce the computational burden is to assign heliostats in predefined assignment groups to create a rough baseline and then assign further heliostats using the cost function minimization algorithm.

Each heliostat may be made to have a more uniform flux on a primary receiver (or receiver section) by prioritizing the assignment of heliostats or groups of heliostats to aiming points of the primary receiver (or receiver sections) over the assignment of heliostats to aiming points on the secondary receivers (or receiver sections). This prioritization is optimally included in a set of operating procedures of the system and/or programmed into a computerized control system. By prioritizing the assignment of heliostats to the primary receiver, the uniformity may be optimized or uniformity may be held within a predefined range because the pool of available heliostat assignments is greatest during this phase of the assigning process and therefore the criteria for assignment of heliostats to the primary receiver do not have to be as compromised in the resulting schedule of assignments. This may result in an optimization of uniformity or merely ensure that some uniformity threshold criterion is met, according to the scheme selected.

With reference to FIG. 1A, an example of a solar energy-based power generation system 100 can include a solar receiver 102, which can be a target for solar radiation reflected thereonto by heliostats 110 for the purpose of heating a working fluid. The receiver 102 can be located at the top of a single solar power tower 108, or at some other location, for example, if an intermediate reflector is used to bounce light received at the top of a tower down to a receiver located at ground level. The receiver 102 may include members for containing a fluid, such as tubes, conduits or cavities, and may also include elements for conveying a fluid to and from these members, such as pipes, ducts, channels or headers.

Each heliostat in the field 110 can track the sun so as to reflect light onto the receiver 102 in the tower 108. Heliostats can be arrayed in any suitable manner, but preferably their spacing and positioning are selected to provide optimal financial return over a life cycle according to predictive weather data and at least one optimization goal such as total solar energy utilization, energy storage, electricity production, or revenue generation from sales of electricity.

As shown in FIG. 1A, the single-tower system 100 can include multiple receivers, for example, a primary receiver 106 and a secondary receiver 104, on a single tower 108, where each receiver can have a different functionality. In general, the primary receiver 106 requires a more uniform and/or more accurate heat flux profile on its surface than the secondary receiver 104 due to a higher operating temperature and/or lower flux requirement. For example, the primary receiver 106 may be used to superheat steam generated in the secondary receiver 104. Although shown adjacent in FIG. 1A, the primary and secondary receivers may be spaced apart on the central tower 108. Each heliostat in the field of heliostats 110 can be directed to focus incident solar radiation onto one of the receivers, as directed by a control system (not shown) or operator. For example, the heliostats closest to the central tower 108, such as heliostat 112 can focus radiation 114 onto primary receiver 106 while heliostats farther from the central tower 108, such as heliostat 116, can focus radiation onto secondary receiver 104.

Figure 1B:
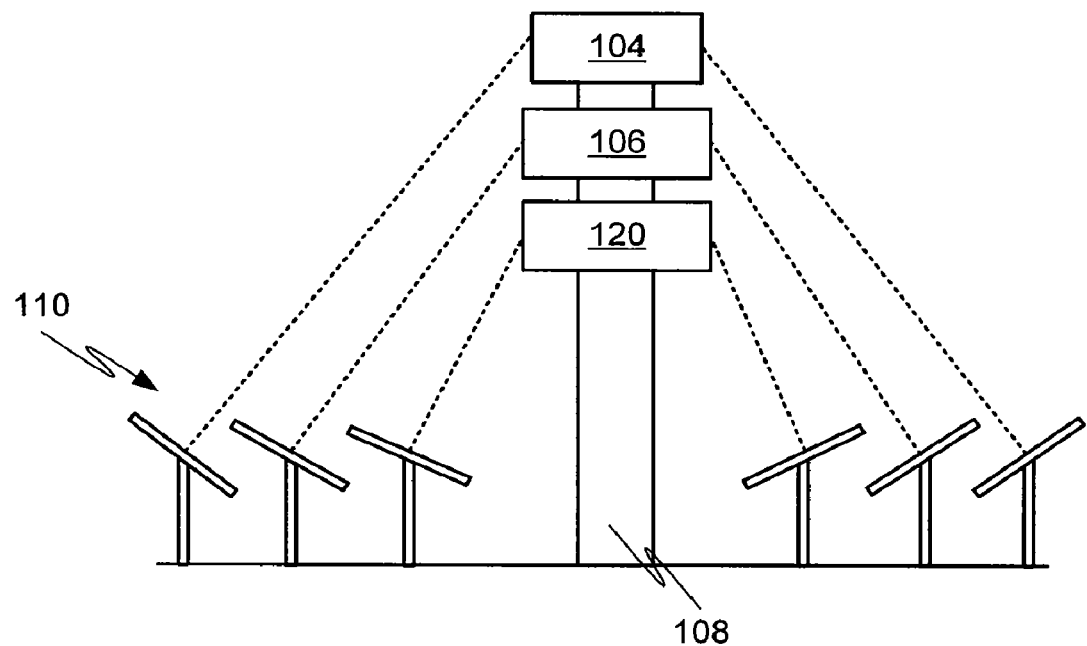
FIG. 1B is a diagrammatic elevation view of a solar power tower with multiple receivers in a field of heliostats.

In an alternate configuration shown in FIG. 1B, a single-tower system can include three or more receivers, where a secondary receiver 104 heats a fluid to a first temperature and a primary receiver 106 heats a fluid, including the same fluid, to a second temperature which is higher than the first. The third receiver 120 can be used for reheating a fluid in a turbine reheat cycle to substantially the second temperature.

Figure 2A:
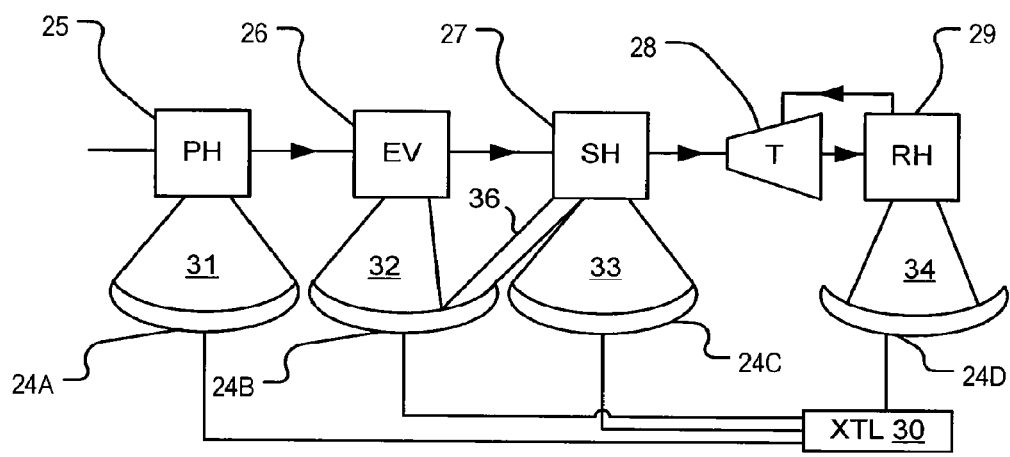
FIG. 2A is a simplified diagram showing a layout of various solar receivers with associated heliostats in a turbine based solar power system.

Referring now to FIG. 2A, a solar energy based power system can include a preheating stage, an evaporation stage, a superheating stage, and a reheating stage. A receiver, a section of a receiver, or multiple receivers or sections are represented by the box indicated at 25. For simplicity this will be referred to as receiver 25. Receiver 25 is configured such that a selected quantity of light 31 from a heliostat array 24A is incident thereon. A controller 30 controls each of the heliostats (not shown individually in this figure) in the arrays 24A-24D. Note that heliostat array 24A-24D may all be part of the same field or separate fields. The array 24A includes a selected set of heliostats and does not necessarily represent a contiguous array. The array 24A is preferably a subset of a larger set of heliostats which includes those of arrays 24B, 24C, and 24D. The light 31 heats the receiver 25 which in turn preheats a working fluid, for example, water, either directly or via a combination of a circulating heat transfer fluid and a heat exchanger, which are not shown. The preheated working fluid is then evaporated in an evaporating stage by the heat collected by a receiver 26 (which also may be one or more receivers or receiver sections). The light 32 from heliostat array 24B is incident on the evaporator receiver 26 and provides the energy for evaporation. Similarly, light 33 from heliostat array 24C is incident on the superheating receiver 27 and provides the energy for superheating the evaporated working fluid, for example, steam. The superheated steam drives a turbine 28. A reheat section 29 can receive radiation 34 from its own associated heliostat array 24D as well.

Preferably, at least some of the receivers 25-27 and 29 are configured such that they can be selectively illuminated by selected heliostats of respective arrays in the manner discussed above. That is, selected heliostats focused one receiver can be diverted to a primary receiver, such as the superheating receiver 27 or the reheating receiver 29, to achieve any of several objectives. This diversion of heliostats, for example, from one receiver 26 to another receiver 27, is illustrated in FIG. 2A by the flux indicated figuratively at 36. Note that the embodiment of FIG. 2A may be modified to include more or fewer stages and the stages may be different, such as for example with a Brayton cycle-based system using air. In the latter case, the stages may be temperature stages.

According to various embodiments, when the ability of certain heliostats to supply reflected light to a particular receiver is compromised, such as by transient cloud coverage or heliostat faults, heliostats can be reallocated to achieve specified control goals, such as temperature uniformity of a high temperature receiver. Any of the arrays 24A through 24D may be configured to be divertible in such a manner to achieve various objectives.

Figure 2B:
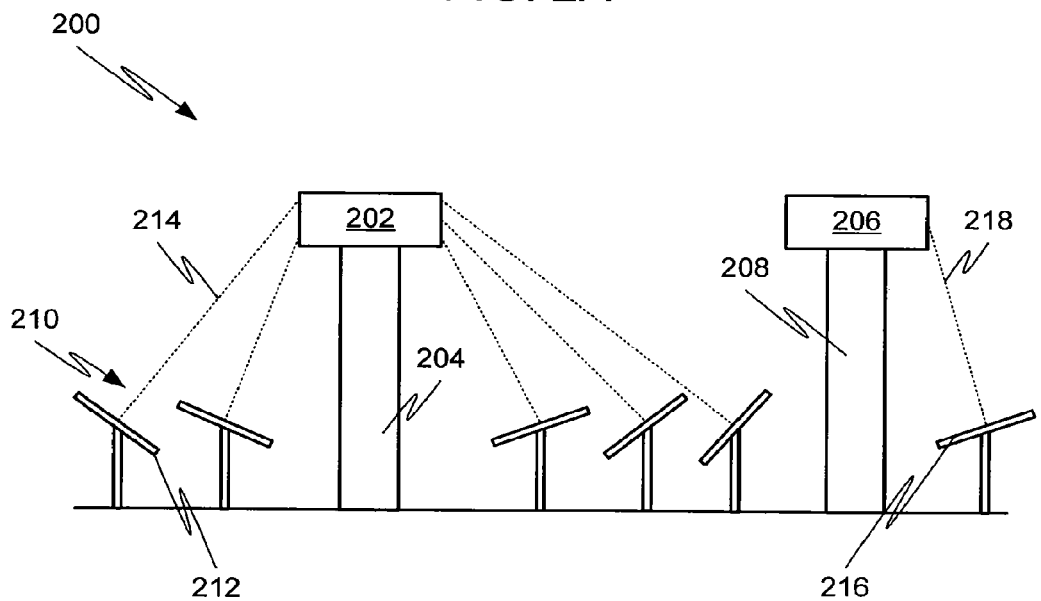
FIG. 2B is a diagrammatic elevation view of a pair of solar power towers with different receivers in a field of heliostats.

With reference to FIG. 2B, an example of a solar energy-based power generation system 200 include multiple towers 204, 208 in a field 210 of mirror-bearing heliostats. In such a multi-tower system, each heliostat can change its targeting between the various towers in the system, for example between towers 204 and 208, depending on operating requirements and other conditions. A primary receiver 202 can be located at the top of a first tower 204 while a secondary receiver 206 can be located at the top of another tower 208. As discussed above with reference to FIG. 1A, the primary receiver 202 can require a more uniform and/or more accurate heat flux profile on its surface compared to the secondary receiver 206. For example, the primary receiver 202 may be used to superheat steam generated in the secondary receiver 206.

Each heliostat in the field 210 can track the sun so as to reflect light onto the receivers 202, 206 in respective towers 204, 208, as directed by a control system (not shown) or operator. For example, the heliostats closest to the tower 204 with the primary receiver 202, such as heliostat 212 can focus radiation 214 onto primary receiver 202 while heliostats further from tower 204, such as heliostat 216, can focus radiation onto secondary receiver 206 in tower 208.

In an alternate configuration, a multi-tower system can include three or more receivers in respective towers, where a secondary receiver heats a fluid to a first temperature and a primary receiver heats a fluid, including the same fluid, to a second temperature which is higher than the first. The third receiver can be used for reheating a fluid in a turbine reheat cycle to substantially the second temperature. In another example, similar to the single tower embodiment discussed above, a multi-tower system can also include at least one tower with multiple receivers. In yet another example, the at least one tower with multiple receivers can use at least one receiver for reheating a fluid in a turbine reheat cycle.

Because of the large number of heliostats, which could be on the order of tens of thousands, deployed in a commercial solar power tower system, the heliostats are optimally controlled by a computerized control system and directed thereby to aim, or focus, reflected solar radiation on specific aiming points on specific receivers. The aiming points so directed change depending on operating requirements and other conditions.

In a multi-tower system, each heliostat can be assigned to track sunlight onto a different tower, or to the tower to which it is normally assigned, or to any other tower. The normal assignment may be provided in a normal assignment table in one or more digital controls. The schedule may contain predefined assignments of heliostats to receivers according to time of day and/or time of year. Thus, on a typical cloudless day in which all heliostats are operative, for a given time of day and a given time of year, each heliostat can be assigned to track the sun such that the light it captures is reflected onto a particular assigned receiver. The location of the heliostat relative to the receiver may not necessarily indicate the receiver to which it is assigned since interleaving rows of heliostats in adjacent fields produces certain real estate utilization advantages.

Also, preferably, each switchable heliostat is equipped to receive electronically or mechanically transmitted instructions to switch receivers, the instructions being transmitted over wires or fiber optic cables, or wirelessly, or, alternately, through physical action or adjustment made by an operator who is physically present from time to time at each heliostat.

Also, preferably, a control system is provided for transmitting direction-fixing or direction-changing instructions to at least one heliostat, causing the at least one heliostat to switch reflective focus from one solar receiver to another, including from the tower to which the heliostats are normally assigned to a second tower, or back to the tower to which the heliostats are normally assigned from a second tower, or from one tower to another when neither of them is the tower to which the heliostats are normally assigned. In yet another particularly preferred embodiment, the control system transmits simultaneous direction-fixing or direction-changing instructions to a plurality of heliostats in one or more of the heliostat fields. In accordance with a further particularly preferred embodiment, the control system transmits simultaneous direction-fixing or direction-changing instructions to all heliostats in all of the heliostat fields.

The transmitted instructions may include, but not exhaustively, information regarding when a switch is to be made, for how long each heliostat is to remain switched, and to where each switched heliostat will be switched next. Heliostat or heliostat-mounted control systems may be equipped to store such instructions for later execution and/or data retrieval.

The control system may provide instructions based on previously programmed field configurations, on ad-hoc or single-use configurations, or on up-to-the-minute calculations of field and system parameters that may include, but not exhaustively, instantaneous and cumulative solar flux, other climatic conditions and measurements, receiver inlet and outlet temperatures and pressures, receiver heat flux measurements, time of day, day of the year, differential electricity tariffs, regulatory fossil fuel allowances and restrictions, power purchase agreements with electric companies, revenue targets, and maintenance requirements, where the calculations are dynamically performed by an operator with or without the aid of a computerized performance model or alternatively by a computerized performance model without the intervention of an operator.

In a multi-tower system, the functionality of one receiver may be different than that of another. For example, one or more secondary receivers may be used to heat a fluid to a first temperature, and a primary receiver used to further heat the same fluid (or a different fluid) to a second temperature which is higher than the first. Similarly, in a single-tower system, a receiver may be divided into sections with different functionalities. For example, in the northern hemisphere, the northern section (i.e., secondary receiver section) of a central receiver may be used to heat a fluid to a first temperature, and the southern section (i.e., primary receiver section) of the same central receiver used to further heat a fluid to a second temperature higher than the first. This example criterion may be modified based on geographic location. For example, the above-criterion may be altered for a geographic location in the southern hemisphere versus a location in the northern hemisphere. The fluid-containing members and fluid-conveying elements are designed and positioned consistent with the pressures, temperatures, flow rates and fluid composition desired in the respective receivers or receiver sections.

According to an embodiment, a method of operating a power tower system includes assigning heliostats to target points on the primary receiver to optimize flux distribution on the primary receiver (or section of a receiver) and only then on at one or more other receivers, e.g., the secondary receiver. The assigning is optimally performed by a computerized control system and/or a system operator. The heliostats selected for the primary receiver may form a contiguous or non-contiguous array, and in another alternative embodiment can be a combination of heliostats forming continuous or non-contiguous groups. In a preferred embodiment, a solar power tower system includes multiple sets of heliostats, and the heliostats assigned to the primary receiver can be from one of the heliostat sets or from more than one. The system operator or control system assigns heliostats according with priority given to the criteria that account for heat flux uniformity, and/or additional criteria as discussed above. According to the method, the specific heliostats selected to focus on the primary receiver or receiver section will change during the course of a day and from season to season in accordance with the change in the apparent position of the sun in the sky.

In a preferred embodiment, the primary receiver (or receiver section) is the highest-temperature or lowest-flux receiver or receiver section in the system. In an especially preferred embodiment, a fluid is heated to a higher temperature in the primary receiver (or receiver section) than in at least one other receiver (or receiver section), e.g., a secondary receiver. In another especially preferred embodiment, a fluid is heated to a higher temperature in the primary receiver (or receiver section) after it has been heated in at least one other receiver (or receiver section), e.g., a secondary receiver.

In another preferred embodiment, the assignment of heliostats to a receiver and aiming points thereon is based on factors which include predictive weather data, including insolation data and seasonal and hourly apparent sun position. In an especially preferred embodiment, the predictive weather data includes at least one of historical weather data and a weather forecast. In another especially preferred embodiment, the factors include differential electricity tariffs which place a higher value on electricity produced at certain times than on electricity produced at other times. In yet another especially preferred embodiment, the assignment of heliostats is updated periodically or continuously in response to measured and/or forecasted environmental conditions, as well as feedback from the receiver which includes, but not exhaustively, temperature measurements at the receiver, thermal photogrammetry, and light-intensity photogrammetry.

In an embodiment, the heliostats of the fields are controlled to direct light onto the receivers so as to provide a goal temperature profile (or goal flux profile) on the primary receiver (or receiver section). For example, controlling the heliostats can be focused on providing the primary receiver with a uniform profile (i.e., variation across the surface of the receiver within a predetermined level) and/or adherence to a predetermined profile. In the primary receiver (or receiver section), because of high pressures and temperatures, the highest operating temperatures may be achieved within channels of materials of limited mechanical tolerance when there is a specified degree of temperature uniformity. The degree of uniformity of temperature/flux or the desired temperature or flux profile will vary based on the design, but in order ensure against hot spots where failures may occur or non-uniform temperatures which may create thermal stresses due to differential expansion, a goal temperature profile or uniformity level may be defined. By controlling the heliostats such that at least selected heliostats can be aimed at primary receiver (or receiver section), the ability of a system to achieve the goal state with high utilization efficiency of the heliostats and real estate can be achieved.

The fluid heated in the primary receiver (or receiver section) can be a gas or a supercritical fluid. For example, the supercritical fluid can be steam generated in at least one other receiver (or receiver section), e.g., a secondary receiver, at a pressure of more than 220 bar and conveyed to the primary receiver (or receiver section) where it is further heated to a temperature above 600° C. In another example, the supercritical steam can be further heated in the primary receiver (or receiver section) to a temperature above 650° C. In a further example, the supercritical steam can be further heated in the primary receiver (or receiver section) to a temperature above 700° C. In yet another example, the supercritical steam can be generated at a pressure of more than 250 bar.

In another embodiment, the assignment of heliostats for the primary receiver (or receiver section) can be made without regard to the potential impact on flux distribution on the at least one secondary receiver (or receiver section). For example, solar radiation may be temporarily reduced in parts of a heliostat field by partial cloud cover. In such a scenario, heliostats can be assigned to achieve optimum flux distribution on a primary receiver (or receiver section) without considering the potential impact on other factors such as flux distribution on the at least one secondary receiver (or receiver section). The reassignment of heliostats to the primary receiver because of the temporary partial cloud cover leaves at least one secondary receiver with insufficient or poorly distributed reflected solar radiation for properly performing its designed heating function at a given fluid flow rate. The fluid flow rate in that at least one secondary receiver may thereupon be reduced until such time as the required level of insolation, or substantially uniform distribution thereof, is restored. In another example, the insufficient or poorly distributed reflected solar radiation at the at least one secondary receiver may cause a localized hotspot on the surface of that secondary receiver.

In a preferred embodiment, the optimization of flux distribution on the primary receiver (or receiver section) can be performed either on the basis of uniformity of flux distribution, including achieving minimum flux differences, or on the basis of accurate adherence to a preselected set of values, including maximum flux values. Flux may be measured or calculated by methods that include, but not exhaustively, temperature measurements at or internal to the receiver, thermal photogrammetry, and light-intensity photogrammetry.

In another preferred embodiment, the optimization can be performed either on the basis of uniformity of temperature distribution, including achieving minimum temperature differences, or on the basis of accurate adherence to a preselected set of values, including maximum temperature values.

According to another embodiment, a method for operating a power tower system includes assigning heliostats to optimize flux distribution first on two primary receivers (or receiver sections), and only then on at least one secondary receiver (or receiver section). In a preferred embodiment, the two primary receivers (or receiver sections) are the highest-temperature and/or lowest-flux receivers (or receiver sections) in the system. In an especially preferred embodiment, a first of the two primary receivers (or receiver sections) is used for heating to a higher temperature a working fluid previously heated to a first temperature in the at least one secondary receiver (or receiver section). A second of the two primary receivers can be used for reheating a fluid extracted from a turbine with a reheat cycle. In another especially preferred embodiment, the second of the two primary receivers (or receiver section) used for reheating can be the lowest-flux receiver (or receiver section) of any receiver in the solar-energy power system. Furthermore, the second of the two primary receivers (or receiver section) used for reheating can be optimized before the first of the two primary receivers (or receiver sections), i.e., before the one used for heating to a higher temperature a working fluid previously heated to a first temperature in the at least one secondary receiver (or receiver section).

In another embodiment, a control system provided for operation in a solar-energy power system can be configured to assign heliostats to optimize flux distribution first on a primary receiver (or receiver section) and only then on at least one secondary receiver (or receiver section). In alternative embodiments, the control system can be programmable and can be programmed with flux or temperature optimization goals that give priority to at least one primary receiver (or receiver section) over at least one other receiver (or receiver section).

In a preferred embodiment, the control system can include a centralized control system configured to transmit instructions. The control system can also include a plurality of individual heliostat controllers capable of receiving such instructions from the centralized control system. The instructions can include focusing on aiming points on specific receivers (or receiver sections). At least some of the instructions can include focusing on aiming points on a specific receiver (or receiver section) in order to meet/achieve the flux or temperature optimization goals programmed into the control system.

In an embodiment, the control system can employ one or many optimization algorithms and/or strategies for determining aiming points of heliostats to provide a uniform and/or accurate heat flux profile on the primary receiver (or receiver section). The optimization algorithm/strategies may be performed on all of or only a portion of the heliostats in the field. The optimization algorithms/strategies may also include pre-ranking of the heliostats based on predetermined criteria for a given system condition. For example, some pre-ranking may occur based on the appropriateness of each heliostat to provide a particular heat flux given the time of day and time of year and/or on the quality (uniformity, accuracy, spot size, cosine losses, occultation, etc.) of the radiation reflected by each heliostat for the primary receiver. Such optimization algorithms and/or strategies can periodically repeat at fixed intervals, for example, every 10 minutes. In an example, the optimization algorithms and/or strategies are configured to repeat whenever a non-uniform heat flux profile of the primary receiver is detected by a feedback mechanism. In another example, the optimization algorithms and/or strategies are configured to repeat whenever a deviation from a predetermined profile for the temperature and/or heat flux on the surface of the primary receiver is detected by a feedback mechanism.

For example, a heuristic algorithm can be employed on a portion of the heliostats in the field to determine the aiming points generating the most uniform and/or most accurate heat flux profile in a given processing time. The heuristic algorithm may be followed by an algorithm optimizing the uniformity and/or accuracy obtained by the heuristic algorithm. In effect, the optimizing algorithm "fills in" deficient areas with reflected radiation from the heliostats in the field outside of the heuristic optimized portion. Alternatively, the heuristic algorithm may be applied to all of the heliostats in the field. In another example, a greedy algorithm can be applied on any or all of the heliostats in the field. In still another example, a functional minimizing algorithm may be employed with a goal of minimizing a measure of uniformity and/or accuracy by optimizing a heliostat-target vector. In yet another example, a Monte Carlo simulation method may be employed to determine the optimum aiming configuration for the field of heliostats to obtain a uniform/accurate heat flux profile on the primary receiver without consideration of the effects on the secondary receiver.

In another preferred embodiment, the control system can receive substantially real-time feedback from at least one feedback mechanism. The at least on feedback mechanism can include, but is not limited to, temperature measurements at or within the receiver(s), thermal photogrammetry, and light-intensity photogrammetry. In one example, temperature and/or flux of the primary receiver (or receiver section) can be measured in real time and used to control heliostats to adjust the heat flux on the primary receiver (or receiver section) to a desired profile. For example, infrared and/or optical video can be used to see radiation emanating from the primary receiver (or receiver section) so as to judge temperature and/or flux parameters. Also, temperature sensors, such as thermocouples, may be embedded in the primary receiver (or receiver section) and used as control inputs for controlling the heliostats. In order to control the heliostats to correct a measured configuration or seek a goal configuration, a model-based control system can be employed that obtains inputs, such as the level of insolation on each respective heliostat, the pattern of light that is reflected by each heliostat for a given angle of incidence and aiming, and other parameters, which may be stored in a memory.

In yet another preferred embodiment, the control system can be programmed to use predictive weather data, including insolation data and seasonal and hourly apparent sun position, and at least one optimization goal such as total solar energy utilization, energy storage, electricity production, or revenue generation from sales of electricity, for formulating the instructions that are transmitted to heliostats. In an especially preferred embodiment, the predictive weather data includes at least one of historical weather data and a weather forecast.

As discussed above, a principal criterion for optimization is that solar radiation reflected onto the external surface of the primary receiver conforms to some goal flux distribution or temperature distribution profile. This uniform distribution allows for precise control of the conditions of the primary receiver. For example, precise control of the primary receiver may enable precise control of superheated steam conditions, which may be necessary for efficient use of the steam by a steam turbine electric power plant. Variations in the solar heat flux incident on the surface of the primary receiver (i.e., a non-uniform heat flux) may affect the state of the working fluid exiting therefrom, which, in turn, could adversely affect power generation efficiency. Further, variations in the solar heat flux may lead to localized temperature variations (i.e. hot spots) on the surface of the primary receiver. These hot spots may have a temperature exceeding the failure threshold for the primary receiver material. In addition, the temperature variation between adjacent portions of the primary receiver may induce thermal stresses due to differing amounts of thermal expansion that could lead to eventual failure. By ensuring a uniform heat flux distribution, the highest possible temperature can be achieved for the working fluid (e.g., superheated steam) without localized hot spots that may damage the primary receiver. In accordance with this goal, an exemplary embodiment of the present invention seeks to maintain a uniform heat flux distribution on the primary receiver by dynamically controlling the focal points of heliostats.

Figure 3A:
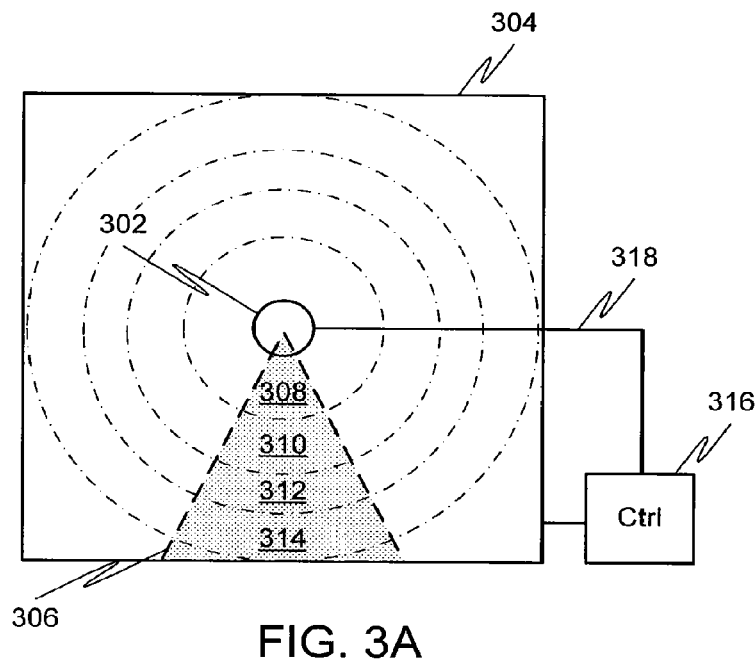
FIG. 3A is a simplified diagrammatic plan view of a solar power tower in a field of heliostats.

FIG. 3A shows an example of a solar energy-based power system having a single tower 302 including at least a primary receiver (or receiver section) and a secondary receiver (or receiver section). Surrounding the tower 302 is a field 304 of heliostats (individual heliostats not shown). Although the field 304 is shown to be square in FIG. 3, any shape may be employed for the heliostat field, such as, but not limited to, oval, polygonal, crescent-shaped, and other non-regular geometric shapes. Furthermore, although the tower 302 is shown centered in the field 304, the tower 302 may be located elsewhere in the field, such as off-center, or outside of field 304.

As discussed above, the primary receiver in tower 302 requires more uniform and/or accurate heat flux profile on a surface thereof due to a higher operating temperature or a lower heat flux requirement compared to the secondary receiver. The focal direction for each heliostat in the field 304 is dynamically configurable such that the radiation reflected from a particular heliostat may be directed from the secondary receiver (or receiver section) to the primary receiver (or receiver section) and vice-versa.

Controller 316 controls the focal direction for the heliostats in field 304. Although only a single controller is shown, separate controllers may be provided for portions of the heliostat field 304 and/or for each heliostat in the field. Controller 316 can monitor the heat flux on the primary receiver (or receiver section) in tower 302 and gauge heat flux uniformity and/or adherence to predetermined flux or temperature profile. Alternately, a separate system may be provided which monitors the heat flux distribution on the primary receiver and conveys such information through feedback 318 to the controller 316 for subsequent optimization of the focal direction of the heliostats in the field 304.

Monitoring the heat flux and/or temperature distribution on the primary receiver may be achieved by a variety of techniques. For example, thermocouples or other temperature sensors may be affixed to the surface of the primary receiver or in the vicinity of the surface of the primary receiver. Variations in the temperature may then be correlated to variations in incident heat flux on the primary receiver. In another example, remote temperature or heat flux measurements of the primary receiver surface may be obtained using, for example, thermal imaging techniques so as to determine the profile of reflected optical energy.

In another example, the radiation incident on each heliostat in the field 304 may be monitored using photometric techniques. An image capture system, for example, one employing a digital camera, can capture images of reflectors that can be mounted on some or all of the heliostats in the field or of reflectors that can be positioned at various points in the heliostat field. The reflectors may be diffuse reflectors having a selective surface coating or color that makes their images easier to separate from any background image or noise. The quantity of light falling on the reflectors can be determined by appropriate optical and digital filtering and image processing using suitable techniques.

Additionally or alternatively, each heliostat or group of heliostats in the field may be provided with an insolation level detector, such as a pyranometer or pyrheliometer. The insolation level detectors may be mounted in the center of the heliostat or at another location thereon so as to provide a measure of the solar energy incident on each heliostat. Alternatively, a plurality of insolation level detectors may be strategically placed throughout the field of heliostats, whereby the insolation level detected by each detector is correlated with a number of the heliostats surrounding it.

In the event of a disruption to the uniform insolation distribution on the primary receiver (or receiver section), heliostats may be reoriented to compensate for the disruption. The disruption may be due to mechanical failure of one or more heliostats in the field, occultation due to cloud coverage or other shadow effects, fouling of the reflective surface of one or more heliostats, changes in time of day and/or time of year, as well as other causes. Note that the disruption may also be predicted by a predictive control algorithm when the loss of reflected radiation from heliostats is a pre-determinable event. The controller 316 may prioritize the reorientation of the focal points of the entire field or a portion of the field of heliostats to compensate for the nonuniformity on the primary receiver.

For example, in a simplified example, suppose that a portion of the heliostat field is directed at the primary receiver while the remainder of the heliostat field is directed at the secondary receiver. During a disruption, the heliostats currently directed at the primary receiver may be unable to maintain a uniform temperature profile on the primary receiver. This may be determined by measurement of instantaneous energy falling on the heliostats or inferentially by a change in the measure temperature and/or flux on the primary receiver. As a result of the variation of the heat flux profile on the primary receiver, the controller determines that additional heliostats are needed to maintain the uniformity. The controller may calculate a pair of demarcation lines 306 extending radially from tower 302. The demarcation lines 306 may be drawn such that they border encompass a region of the primary receiver surface determined to have a non-uniform heat flux profile. Alternatively, the demarcation lines may be drawn to border a region of the heliostat field 304 known to be causing the non-uniformity on the primary receiver.

The demarcation lines 306 define a candidate region of heliostats in the field 304. This candidate region of heliostats may be further sub-divided into a plurality of groups. For example, the candidate region may be sub-divided into groups 308, 310, 312, and 314, each progressively farther from the tower 302. The number of groups has been chosen merely for illustrative purposes, as any number of groups in the field of heliostats may be used. It is also noted that the sub-division into groups based on distance is merely for illustrative purposes. Other grouping schemes may also be employed. For example, the field of heliostats may be sub-divided based on, but not limited to, focused spot size on the primary receiver surface, focused spot uniformity on the primary receiver surface, cosine losses, accuracy of the focused beam, heliostat location with respect to the primary receiver and/or nonuniformity, and predictability.

Controller 316 may select group 308 closest to the tower 302. For the heliostats within the group 308, the controller 316 determines the amount of heat flux from each heliostat that would be directed on the primary receiver if the heliostats were redirected to focus on the non-uniform region thereof. Based on this calculation, the controller 316 can select any or all heliostats from group 308 for redirection to the primary receiver so as to balance the non-uniform flux region. In the event that the heat flux newly directed on the primary receiver by group 308 is insufficient to overcome the measured non-uniformity, the controller 316 may repeat the analysis and redirection with group 310. Likewise, if the combined heat flux from groups 308 and 310 is insufficient, the controller may repeat the process with group 312. This process may continue with additional groups arranged at distances progressively farther from the tower 302 and within demarcation lines 306 until the non-uniformity in the heat flux distribution is corrected or until some predetermined criteria is met.

Figure 3B:
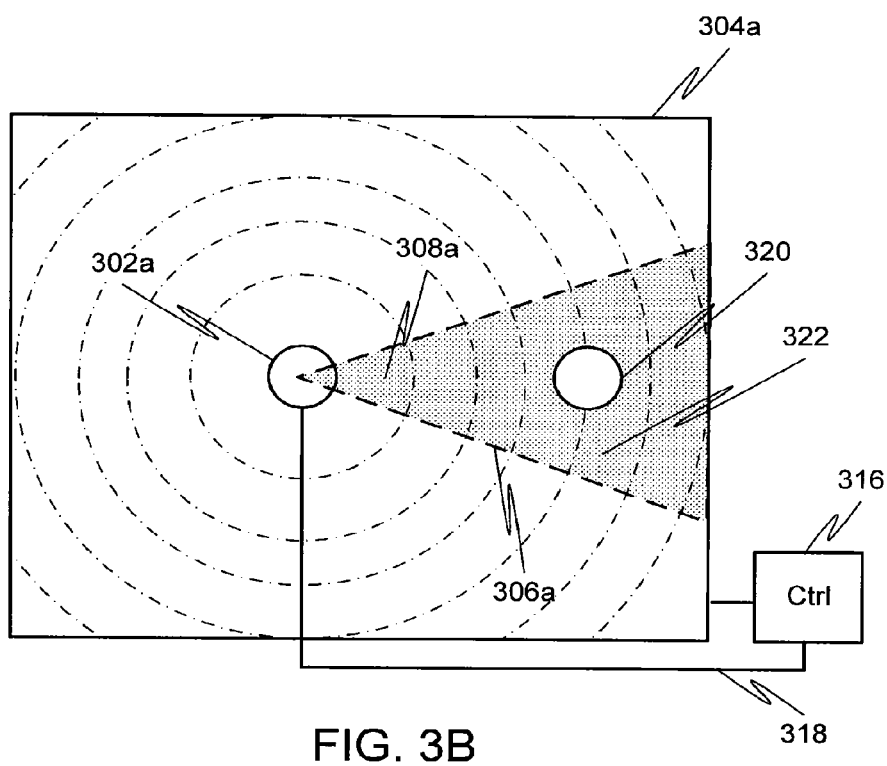
FIG. 3B is a simplified diagrammatic plan view of two solar power towers with different receivers in a field of heliostats.

A similar process may be performed for a multi-tower example, as shown in FIG. 3B. Tower 302a includes a primary receiver while tower 320 has a secondary receiver. Surrounding both towers is a field 304a of heliostats. Controller 316 controls the focal direction for the heliostats in field 304a. Controller 316 can monitor the heat flux on the primary receiver (or receiver section) in tower 302a and gauges heat flux uniformity and/or adherence to predetermined flux profile. As discussed above with regard to the single tower example, to correct a nonuniformity measured in the primary receiver in tower 302a, controller 316 may redirect heliostats in group 308a defined by demarcation lines 306a. However, controller 316 may also redirect heliostats in group 322 proximal to tower 320, which may previously have been directed at the secondary receiver in tower 320, onto the primary receiver in tower 302a.

Note that although according to the above discussion, adjacent heliostats are re-aimed to compensate for loss of adjacent heliostats, the lost heliostats and the redirected heliostats need not lie in adjacent groups. The controller may be provided with sufficient information to "cherry-pick" the most suitable heliostats to use for compensation. Failures or variations in flux on a surface of the primary receiver need not be generated by contiguous portions of the heliostat fields.

It is noted that the above description relates to directing heliostats onto the primary receiver when an insolation or heliostat reflection deficiency leads to the detection of a non-uniform heat flux or a deviation from a predetermined flux or temperature profile. However, variations in insolation or other conditions may cause portions of the primary receiver to exceed a predetermined value (i.e., a hot spot) as well. In such a case, the controller 316 may redirect heliostats focused on the primary receiver to other focal points, such as the secondary receiver or an idle position. As above, demarcation lines 306 may be drawn to define a region of heliostats for potential redirection. These heliostats may be divided into groups based on distance from the tower 302, wherein the controller 316 individually controls the heliostats within each group. The controller may select a group farthest from the tower 302 and determine the amount of heat flux from each heliostat within the selected group. Based on this calculation, the controller 316 can then choose certain heliostats from the selected group for redirection. These heliostats may be redirected to a different tower (e.g., tower 320 in FIG. 3B) or away from any tower (e.g., the sky).

The controller 316 may also command all of the heliostats from the selected group to redirect away from the primary receiver based on the degree of non-uniformity. In the event that the non-uniformity remains after redirection, the controller may then proceed to the next closest group and repeat the above sequence. This process may continue with additional groups within the demarcation lines and progressively closer to the primary receiver until the non-uniformity in the heat flux distribution is corrected or until some predetermined condition is reached.

Other control and optimization techniques are contemplated as well. Controller 316 can employ one or many optimization algorithms and/or strategies in order to determine aiming points on a surface of the primary receiver (or receiver section) for heliostats so as to provide a uniform and/or accurate heat flux profile thereon. Characteristics of the heliostats employed in the optimization algorithms and/or strategies may be stored in the controller or calculated on the fly. In an example, the shape of a beam spot on the surface of the primary receiver for each heliostat may be stored in the controller. In another example, the expected beam projection on the surface of the primary receiver for each heliostat may be determined from stored information. In yet another example, the controller may calculate the expected beam projection for each heliostat based on solar position (time of day, time of year) as well as expected or observed occultation.

In an embodiment, the controller may employ a heuristic algorithm. For example, a field of heliostats may be divided into a first group and a second group. The first group of heliostats may be selected based on the predicted beam spot characteristics of the reflected radiation of each heliostat on the surface of the primary receiver. For example, those heliostats having the most concentrated beam spots on the surface of the primary receiver from the available heliostats may be selected for the first group. In another example, those heliostats having the most uniform and/or the most predictable spot characteristics for the primary receiver may be selected. In still another example, those heliostats closest to the primary receiver may be selected. In yet another example, those heliostats having the lowest cosine losses for the primary receiver for the given time of day and year may be selected for the first group. Any or all heliostats of the first group may be subjected to optimization by a heuristic algorithm, which employs stored or calculated beam characteristics for each heliostat to determine flux characteristics on the primary receiver. After optimization of the targets of the first group on the primary receiver, an optimization algorithm may be employed on the second group of the heliostats to fill in deficient flux areas on the primary receiver. For example, those heliostats in the second group having the greatest flux may be directed to regions where the flux on the primary receiver generated by the first group is deficient. This heuristic optimization process may be repeated at predetermined intervals, for example 10 minutes, or when conditions dictate that optimization is necessary.

In another embodiment, the controller may employ a meta-heuristic algorithm, such as a greedy algorithm, a random optimization algorithm, or a genetic algorithm. For example, the controller may employ a greedy algorithm which makes a locally optimal choice for a heliostat aiming on the primary receiver. Thus, the controller can assign to a target on the primary receiver surface a heliostat which may have the most uniform intensity. The controller would iterate this process until all targets on the primary receiver surface are accounted for. Other criteria may be used for assigning a heliostat to a particular target, such as spot size, predictability, degree of cosine losses, etc.

In another embodiment, the controller may employ a functional minimizing algorithm. As known in the art, a functional provides a map from a vector space to an underlying real number field. For example, an assignment vector representing targets for a field of heliostats or a portion of the field of heliostats can be optimized by applying a brute force algorithm with the goal of minimizing a measure of uniformity (or adherence to a predetermined profile) of the heat flux on the primary receiver (or receiver section) on the entire assignment vector.

In still another embodiment, the controller may employ a Monte Carlo method to optimize heliostat aiming for the primary receiver so as to obtain a uniform heat flux profile thereon. As known in the art, Monte Carlo methods are stochastic in that they employ computational algorithms that rely on random sampling to achieve an optimized result. The controller can determine a domain of inputs from heliostats available to be focused on a particular portion or portions of the primary receiver surface (or receiver section surface). Using Monte Carlo methods, inputs can be randomly generated from this domain. These inputs can then be deterministically analyzed with regard to the heat flux profile on the primary receiver surface (or receiver section surface), preferably with regard to the uniformity of the heat flux profile on the primary receiver surface (or receiver section surface). In a preferred embodiment, this deterministic analysis occurs without regard to the heat flux profile of the secondary receivers. The process can then be iterated until a vector of aiming points (e.g., targets on the primary receiver surface) is obtained for the domain of heliostats that minimizes the non-uniformity of the heat flux profile on the primary receiver surface.

It should be appreciated that steps of the present disclosure may be repeated in whole or in part in order to perform the contemplated optimization of heliostat aiming on a primary receiver. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system, and computer program product for determining optimized heliostat aiming on the primary receiver may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or computer program product for determining optimized heliostat aiming on the primary receiver.

Furthermore, embodiments of the disclosed method, system, and computer program product for determining optimized heliostat aiming on the primary receiver may be readily implemented, fully or partially, in software using, for example, object or object-oriented software development environments that provide portable source code that can be used on a variety of computer platforms. Alternatively, embodiments of the disclosed method, system, and computer program product for determining optimized heliostat aiming on the primary receiver can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized.

Embodiments of the method, system, and computer program product for determining optimized heliostat aiming on the primary receiver can be implemented in hardware and/or software using any known or later developed systems or structures, devices and/or software by those of ordinary skill in the applicable art from the function description provided herein and with a general basic knowledge of the computer, solar energy-based power systems, and optimization arts.

Moreover, embodiments of the disclosed method, system, and computer program product for determining optimized heliostat aiming on the primary receiver can be implemented in software executed on a programmed general purpose computer, a special purpose computer, a microprocessor, or the like. Also, the method for determining optimized heliostat aiming on the primary receiver can be implemented as a program embedded on a personal computer such as a JAVA® or CGI script, as a resource residing on a server or image processing workstation, as a routine embedded in a dedicated processing system, or the like. The method and system can also be implemented by physically incorporating the method for determining optimized heliostat aiming into software and/or hardware systems, such as the hardware and software systems of solar energy-based power system.

It is, therefore, apparent that there is provided, in accordance with the present disclosure systems, methods, and devices for providing a predetermined thermal profile to a primary solar receiver(s) or primary receiver section(s) in a solar energy-based power generation system. Many alternatives, modifications, and variations are enabled by the present disclosure. Features of the disclosed examples can be combined, rearranged, omitted, etc., within the scope of the present disclosure to produce additional embodiments. Furthermore, certain features of the disclosed examples may sometimes be used to advantage without a corresponding use of other features. Persons skilled in the art will also appreciate that the present invention can be practiced by other than the described examples, which are presented for purposes of illustration and not to limit the invention as claimed. Accordingly, Applicants intend to embrace all such alternatives, modifications, equivalents, and variations that are within the spirit and scope of the present disclosure.

What is claimed is:

1. A method for controlling a central solar concentrating energy system, comprising:
    calculating by one or more controllers an amount of energy directable by each of a plurality of heliostats onto each of a primary solar receiver and a secondary solar receiver located at different positions to generate first calculated data representing the amount of energy directable by said each of the plurality of heliostats;
    the primary solar receiver and secondary solar receiver each including heat exchangers configured to heat a working fluid to thereby power a generator;
    at a first time, aiming a first portion of the plurality of heliostats at the primary solar receiver responsively to said first calculated data;
    repeating the calculating by the one or more controllers at a second time to generate second calculated data; and
    at the second time, aiming a second portion of the plurality of heliostats different from said first portion at the primary solar receiver responsively to the second calculated data,
    wherein heliostats of said first and second portions are selected by the one or more controllers in response to a predetermined thermal profile for a surface of the primary solar receiver.

2. The method of claim 1, wherein the predetermined thermal profile includes a predetermined temperature profile on the surface of the primary solar receiver.

3. The method of claim 1, wherein the predetermined thermal profile includes a predetermined heat flux profile on the surface of the primary solar receiver.

4. The method of claim 3, wherein the predetermined thermal profile includes a uniform solar heat flux on the surface of the primary solar receiver.

5. The method of claim 1, wherein the primary solar receiver has a higher operating temperature than the secondary solar receiver.

6. The method of claim 1, wherein the primary solar receiver has a higher operating temperature than the secondary solar receiver, the second portion is selected responsively to a calculation of a uniformity of temperature or energy flux on the surface of the primary solar receiver, and the aiming at the second time is responsive to the calculated uniformity.

7. The method of claim 1, wherein the calculating by the one or more controllers at the second time is responsive to a feedback signal indicating a change in a thermal profile for the surface of the primary solar receiver.

8. The method of claim 1, wherein the predetermined thermal profile includes a predefined temperature range profile.

9. The method of claim 1, further comprising, at the first time, aiming a third portion of the plurality of heliostats at the secondary solar receiver.

10. The method of claim 9, wherein, the second portion includes at least one heliostat from said third portion.

11. The method of claim 1, further comprising:
    after the second time, periodically repeating the calculating by the one or more controllers to generate new calculated data, and periodically aiming a new portion of the heliostats at the primary receiver responsively to the new calculated data, each new portion being selected by the one or more controllers based on the predetermined thermal profile for the surface of the primary solar receiver, wherein the selected new portion is different from the first portion at least one time.

12. A method for controlling a central solar concentrating energy system, comprising:

calculating by one or more controllers respective amounts of energy able to be directed onto a surface of a primary solar receiver and onto a surface of a secondary solar receiver by each of a plurality of heliostats, the primary solar receiver being located at a different position from the secondary solar receiver;

the secondary solar receiver being configured to generate steam using energy directed onto the secondary solar receiver surface, the primary solar receiver being configured to receive the generated steam from the secondary solar receiver and to superheat the steam using energy directed onto the primary solar receiver surface;

at a first time, selecting by the one or more controllers a first portion of the plurality of heliostats and aiming the selected first portion at the primary solar receiver surface in response to the calculated respective amounts of energy;

repeating the calculating by the one or more controllers at a second time; and at the second time, selecting by the one or more controllers a second portion of the plurality of heliostats and aiming the selected second portion at the primary solar receiver surface in response to the recalculated amounts of energy, at least some of the heliostats in the selected first portion being different from those in the selected second portion, wherein each selecting by the one or more controllers is based on a predetermined thermal profile for said surface of the primary solar receiver.

13. The method of claim 12, wherein the predetermined thermal profile includes at least one of: a predetermined temperature profile on the surface of the primary solar receiver, a predetermined heat flux profile on the surface of the primary solar receiver, a uniform solar heat flux on the surface of the primary solar receiver, and a predefined temperature range profile on the surface of the primary solar receiver.

14. The method of claim 12, wherein the primary solar receiver has a higher operating temperature than the secondary solar receiver.

15. The method of claim 12, wherein the primary solar receiver has a higher operating temperature than the secondary solar receiver, the selecting by the one or more controllers at the second time includes determining by the one or more controllers a uniformity of temperature or energy flux on the surface of the primary solar receiver, and the aiming at the second time is responsive to the determining the uniformity.

16. The method of claim 12, wherein the repeating the calculating by the one or more controllers at the second time is responsive to a feedback signal indicating a change in a thermal profile for the surface of the primary solar receiver.

17. The method of claim 12, further comprising, at the first time, selecting by the one or more controllers a third portion of the plurality of heliostats and aiming the selected third portion at the secondary solar receiver.

18. The method of claim 17, wherein, at the second time, the selected second portion includes at least one heliostat from said third portion.

19. A method for controlling by the one or more controllers a central solar concentrating energy system, which has primary and secondary solar receivers, the primary solar receiver being spaced from and operating at a higher temperature than the secondary solar receiver, the method comprising:

aiming a plurality of heliostats such that first ones of the plurality of heliostats are aimed at a surface of the primary solar receiver;

monitoring the surface of the primary solar receiver with respect to a predetermined thermal profile;

calculating by the one or more controllers respective amounts of energy that each of the plurality of heliostats is capable of directing at respective aiming points on the primary and secondary solar receivers;

responsively to measured or predicted variations of the primary solar receiver surface from the predetermined thermal profile, re-aiming at least some of the plurality of heliostats based on the calculated amounts of energy such that the primary solar receiver surface conforms to the predetermined thermal profile.

20. The method according to claim 19, wherein at least one of the heliostats aimed at the primary solar receiver surface as a result of said re-aiming is not one of said first ones.

* * * * *